United States Patent

Murakami

[11] Patent Number: 6,074,105
[45] Date of Patent: Jun. 13, 2000

[54] APPARATUS FOR SUPPORTING AND GUIDING A FILM STRIP IN A CAMERA

[75] Inventor: Naoyuki Murakami, Kawasaki, Japan

[73] Assignee: Nikon Corporation, Tokyo, Japan

[21] Appl. No.: 09/116,431

[22] Filed: Jul. 14, 1998

[30] Foreign Application Priority Data

Aug. 20, 1997 [JP] Japan .................................. 9-238947

[51] Int. Cl.$^7$ .................................................. G03B 17/00
[52] U.S. Cl. ............................................................ 396/440
[58] Field of Search ..................................... 396/440, 441, 396/442, 511, 512, 535

[56] References Cited

U.S. PATENT DOCUMENTS

5,878,297   3/1999   Asakura et al. .................... 396/440 X

Primary Examiner—Howard B. Blankenship
Attorney, Agent, or Firm—Erik B. Cherkak & Associates, LLC

[57] ABSTRACT

Apparatus for supporting and guiding a film strip, a method for making such an apparatus and a camera incorporating the same. The apparatus includes a pressure plate configured to contact a film strip in a direction which corresponds to an optical axis of the camera, and a plurality of guide rails integrally formed with the pressure plate. The plurality of guide rails are configured to support the film strip during photographic operations and to guide the film strip during film movement operations.

13 Claims, 8 Drawing Sheets

APPARATUS FOR SUPPORTING AND GUIDING A FILM STRIP IN A CAMERA

BACKGROUND OF THE INVENTION

1. Field of the Invention

The present invention relates to cameras that utilize film strips and, more particularly, to film strip guide systems that are used to position a film strip to facilitate photographic operations.

2. Description of the Related Art

Film strip guide systems for use in cameras are well known. Such systems are used to guide a film strip across an aperture of a camera in order to facilitate photographic operations. In addition to guiding a film strip, guide systems often are designed to flatten a film strip to ensure accurate photographic operations. A typical arrangement of a film strip guide system is illustrated in three drawing figures which are attached hereto and which have been identified as "FIG. 1,""FIG. 2A," and "FIG. 2B," respectively.

Figure 1:
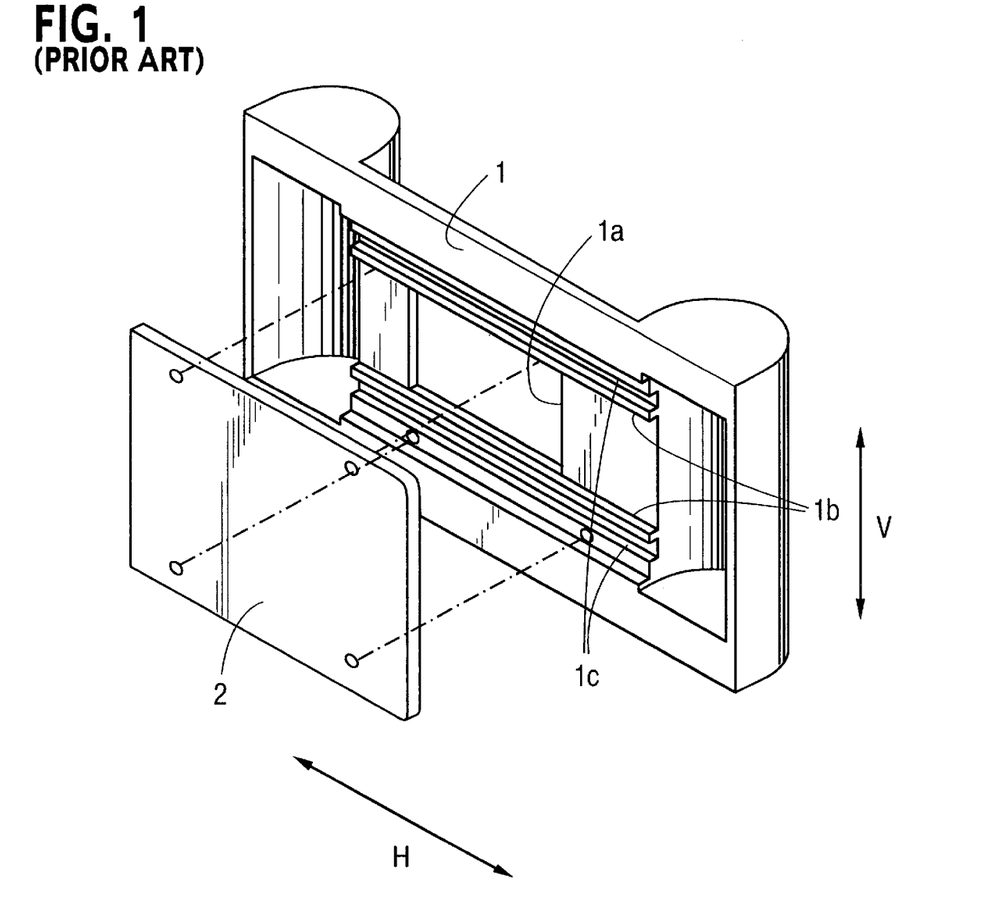
FIG. 1 is an oblique diagram of a camera including a film strip guide system according to the prior art.
Figure 2A:
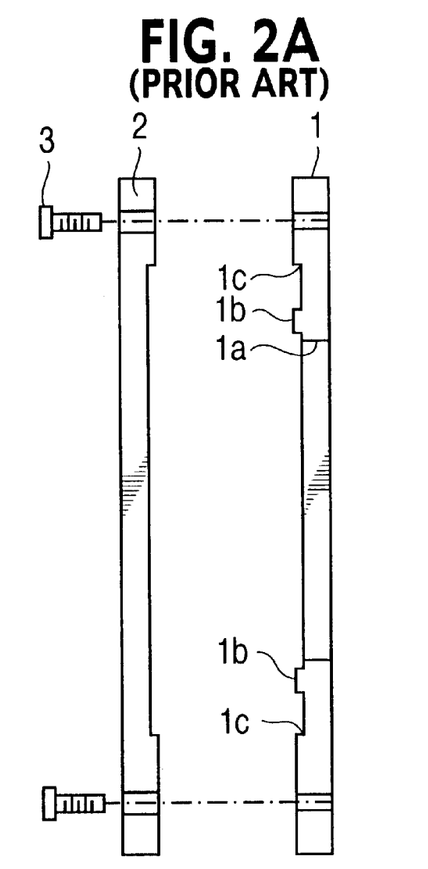
FIG. 2A is a side view of the film strip guide system depicted in FIG. 1.

In particular, FIG. 1 shows a conventional camera having a camera body 1 that includes an aperture 1a. Inner rails 1b and outer rails 1c guide a film strip across aperture 1a. A separately constructed pressure plate 2 is used to flatten the film strip to facilitate photographic operations within camera 1. In FIG. 1, pressure plate 2 may be fixed to camera body 1a by screws 3 (FIG. 2A). Accordingly, in camera 1, a film path tunnel or channel is formed between pressure plate 2 and camera body 1a through which a film strip may be advanced and re-wound.

Figure 2B:
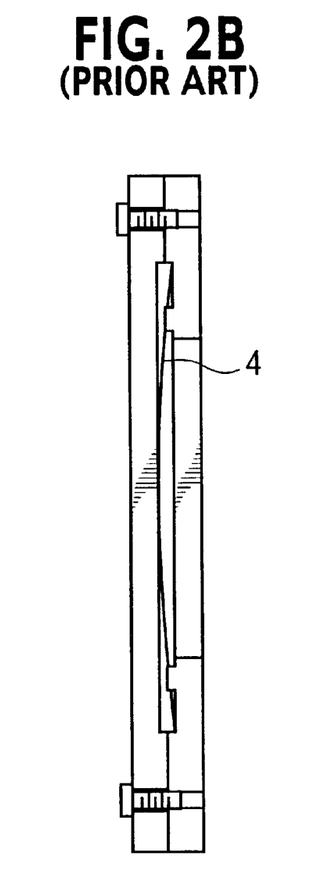
FIG. 2B is another side view of the film strip guide system depicted in FIG. 1.

FIGS. 2A and 2B, illustrate a film strip 4 within the film path channel shown in FIG. 1. The position of film strip 4 in a vertical direction (V) within camera 1 is maintained by outer rails 1c. The position of film strip 4 in a horizontal direction (H) within camera 1 is maintained by inner rails 1b along with pressure plate 2.

Despite the widespread use of film strip guide systems like or similar to those shown in FIGS. 1, 2A, and 2B, such systems are not without their problems. For example, such systems are not very effective at ensuring the flatness of a film strip to facilitate accurate photographic operations. In particular, it is difficult to ensure such flatness between inner rails 1b and pressure plate 2 as a result of screws 3. Tightening each screw 3 to ensure that pressure plate 2 is mounted exactly parallel to camera body 1a has been difficult to achieve, especially during automated assembly procedures, etc. As a result, a film strip like film strip 4 is able to maintain a relatively large crown or bow (as shown in FIG. 2B) which can have a negative affect on photographic operations. As such, a particular area of a film strip may be maintained in a position that does not adhere to a particular focus state within camera 1, thus allowing an otherwise focused image to be inaccurately exposed. And, as a result, such inaccurate exposures have produced bad and lost photographs.

Thus, there exists a need to provide a new and improved apparatus for supporting and maintaining a film strip in a camera to facilitate photographic operations. Such an apparatus must ensure film strip flatness without utilizing conventional film path structures such as separately mountable pressure plates, etc. To be viable, such an apparatus should include both a film guide or rail system and an integrally formed pressure plate structure.

SUMMARY OF THE INVENTION

The present invention has as its principal object to solve the aforementioned problems associated with prior film strip guide systems by providing a new and improved film strip guide apparatus that allows accurate focal plane positioning through effective film strip arrangement and placement.

It is another object of the present invention to provide an apparatus that includes both a film strip pressure plate and an integrally formed film strip guide arrangement that enable a film strip to be flattened within an exposure area within a camera.

It is a further object of the present invention to provide an apparatus that may be mounted within a camera that enables more accurate and even focus states and corresponding photographs to be realized.

These and other objects of the present invention are achieved by providing an apparatus for supporting and guiding a film strip and a camera incorporating the same. The apparatus includes a pressure plate configured to contact and flatten a film strip in a direction which corresponds to an optical axis of the camera, and a plurality of guide rails integrally formed with the pressure plate. The plurality of guide rails are configured to support the film strip during photographic operations and to guide the film strip during film movement operations.

And, according to another aspect of the present invention, provided is a method for making an apparatus for supporting and guiding a film strip in a camera. The method includes the steps of forming a pressure plate configured to contact a film strip in a direction which corresponds to an optical axis of the camera, and integrally forming a guide system with the pressure plate. The guide system is configured to support the film strip during photographic operations within said camera and to guide said film strip during film movement operations.

BRIEF DESCRIPTION OF THE DRAWING FIGURES

The present invention is described below with reference to the following drawing figures, of which.

DETAILED DESCRIPTION OF THE PREFERRED EMBODIMENTS

The present invention is now discussed with reference to the drawing figures that were briefly described above. A discussion of each preferred embodiment of the present invention is followed by a corresponding discussion of its operation. Unless otherwise specified, like parts are referred to with like reference numerals.

Figure 3A:
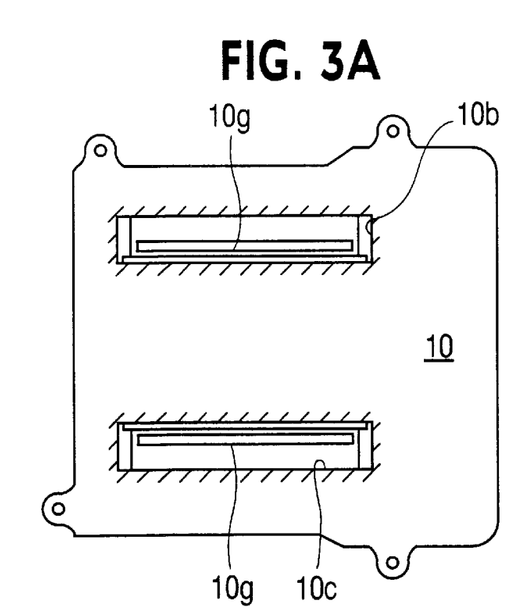
FIGS. 3A, 3B, 3C, and 3D are diagrams of a film strip guide apparatus according to a preferred embodiment of the present invention.
Figure 3B:
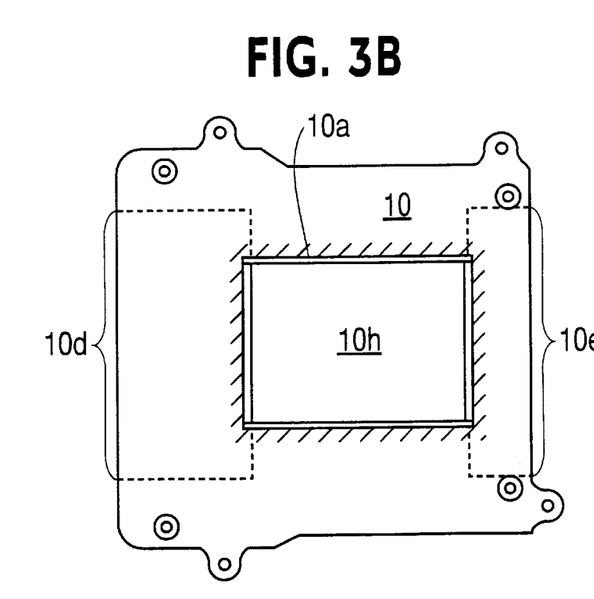
Figure 3C:
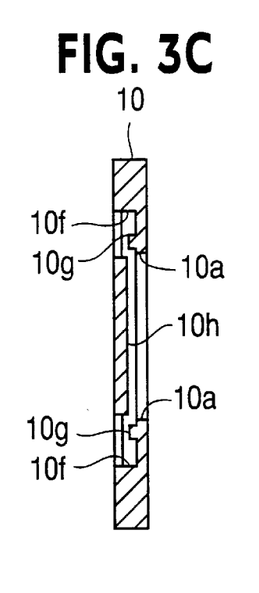
Figure 3D:
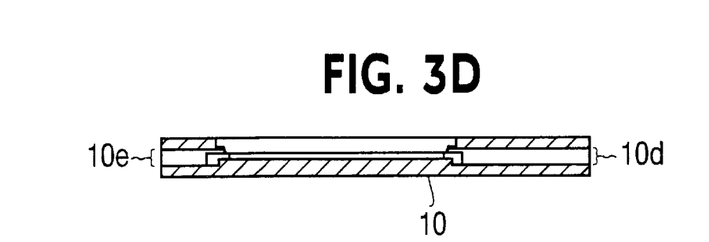

Referring now to FIGS. 3A, 3B, 3C, and 3D, depicted therein are diagrams of a film strip guide apparatus according to a preferred embodiment of the present invention. In particular, a back member of film strip guide apparatus 10 includes openings 10b and 10c which are disposed and formed therein (e.g., molded, machined, etc.). Formed on an interior surface of the back member of apparatus 10 is a pressure plate 10h. Visible within openings 10b and 10c are parts of a front member of apparatus 10. Formed on an interior surface of the front member of apparatus 10 are outer film guide rails 10f (FIG. 3C) and inner film guide rails (10g). As shown in FIGS. 3B and 3D, a film path is accessible from integrally formed openings 10d and 10e which are formed at respective sides of apparatus 10.

It is important to note that the aforementioned structures of apparatus 10 have been integrally formed through use of molding techniques (e.g., plastic molding techniques, metal molding techniques, etc.). Other techniques may be employed including, but not limited to, machining techniques, etc.

Figure 4:
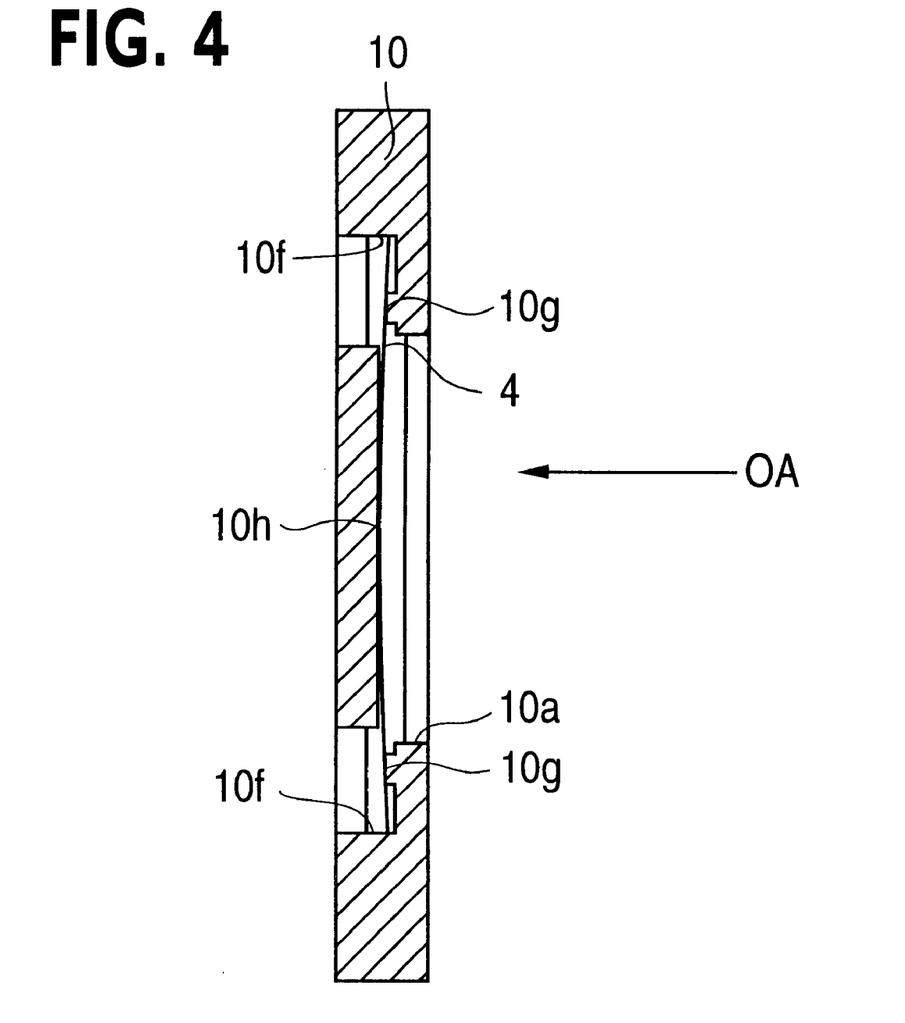
FIG. 4 is a side view of the film strip guide apparatus depicted in FIGS. 3A–3D.

Referring now to FIG. 4, depicted therein is a cross section diagram of apparatus 10 in an operational state. A film strip 4 is positioned and maintained within apparatus 10 relative to an optical axis (OA) of a camera (not shown). As shown, a back surface side of film strip 4 is in contact with (e.g., pushed by) pressure plate 10h. Film strip 4 is held in place and prevented from moving vertically within apparatus 10 by outer rails 10f which form a channel in which film strip 4 may move. Inner rails log contact and push against edges of film strip 4 to keep it in a relatively flattened state against pressure plate 10h within apparatus 10.

Figure 5:
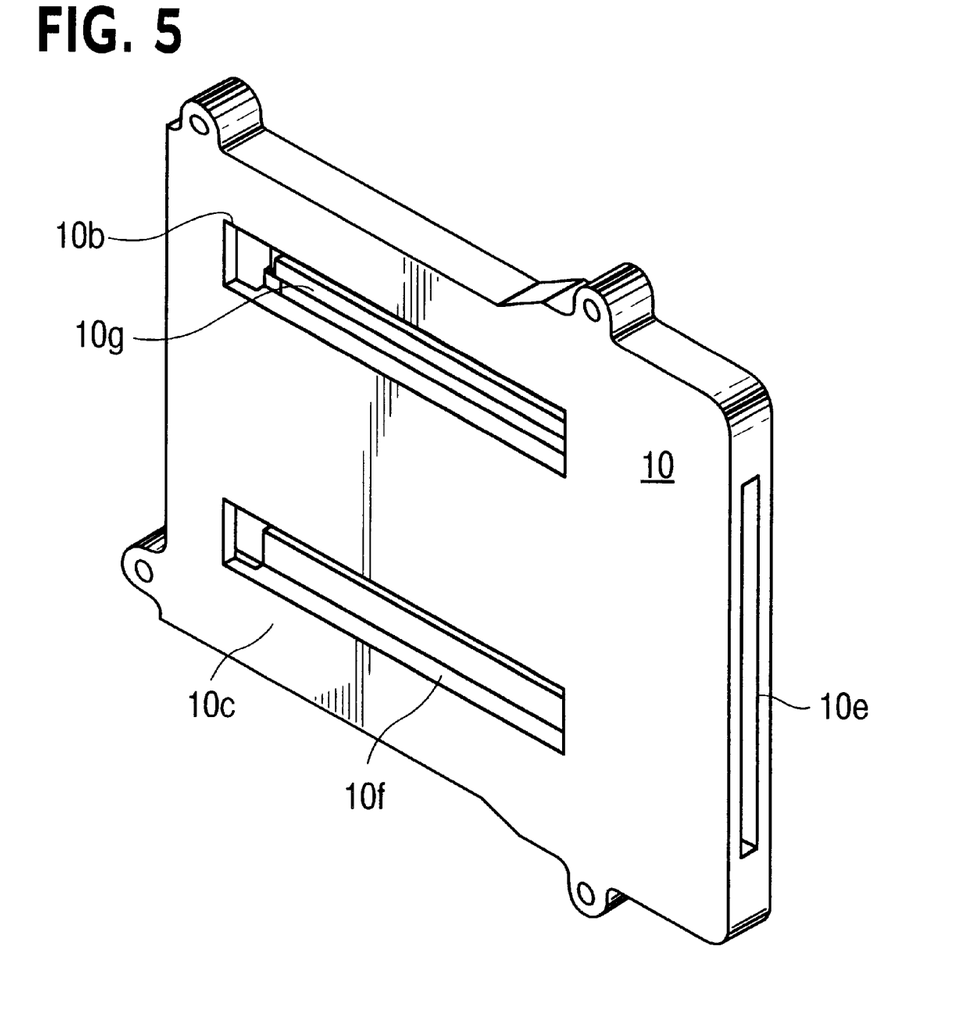
FIG. 5 is an oblique diagram of the film strip guide apparatus depicted in FIGS. 3A–3D.

Referring now to FIG. 5, depicted therein is an oblique diagram of film strip guide apparatus 10. As show, an opening like opening 10e, allows a film strip like or similar to film strip 4 (FIG. 4) to pass through apparatus 10.

Figure 6:
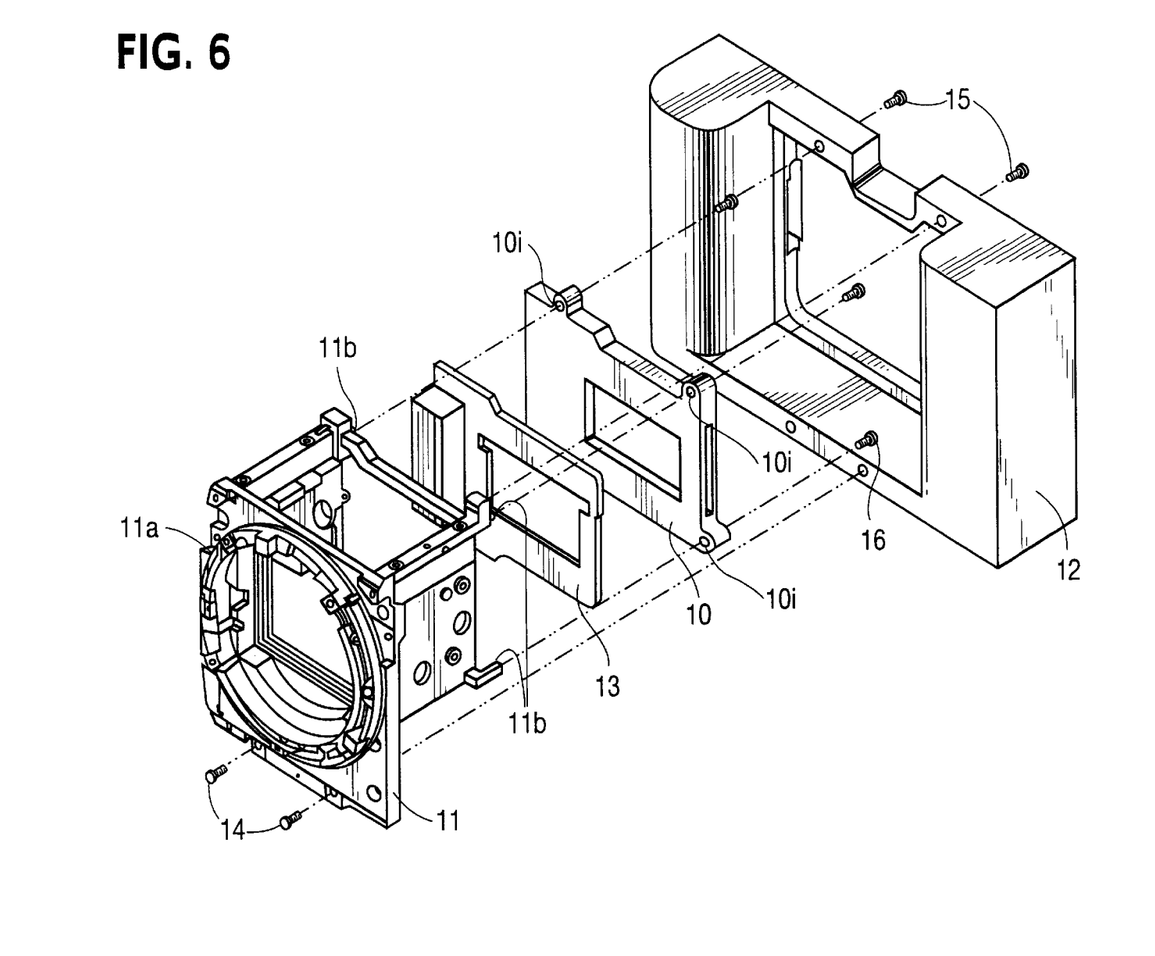
FIG. 6 is an oblique diagram of a camera that incorporates the film strip guide apparatus depicted in FIGS. 3A–3D.

Referring now to FIG. 6, depicted therein is an oblique diagram of apparatus 10 when placed into a camera body. A front body member 11 includes a lens mounting plate 11a. The camera also includes a rear body member 12. Within the camera is a focal plane shutter device 13. Front body member 11 is fixed to rear body member 12 by a fastening arrangement such as by screws 14 and 15, etc.

Apparatus 10 is fixed to front body member 11 by screws 16 which pass through fastener holes 10i and which come into operative engagement with mounting sockets 11b (e.g., threaded holes configured to receive screws, etc.). The distance from lens mounting plate 11a to the film path provided within apparatus 10 and a film strip that may be maintained therein may be accurately and uniformly maintained by controlling the mounting position of apparatus 10.

Figure 7:
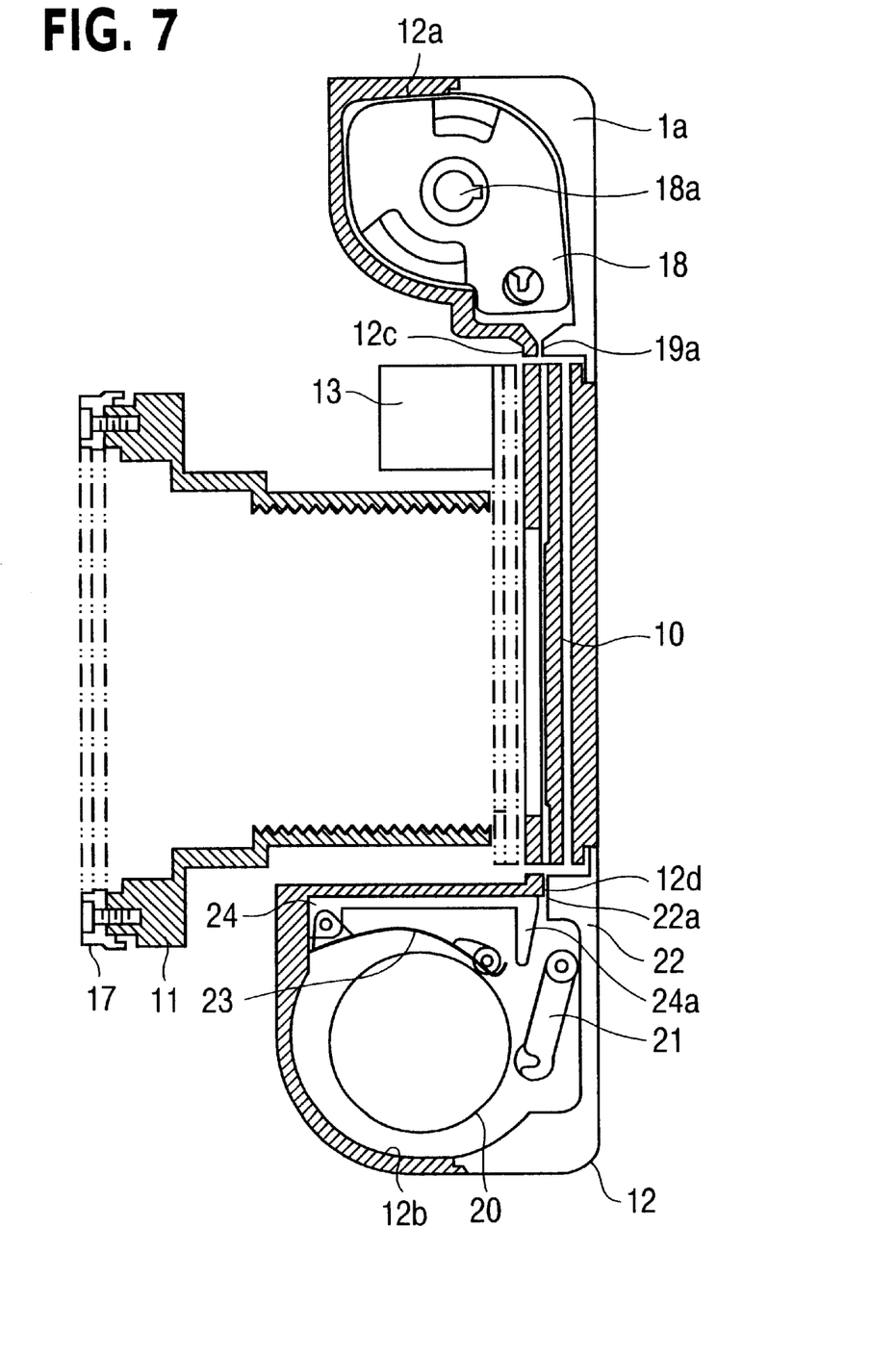
FIG. 7 is a cross-section diagram of the camera depicted in FIG. 6.

Accordingly, referring now to FIG. 7, depicted therein is a cross section diagram of the camera shown in FIG. 6. A mount 17 is disposed to receive a lens (not shown). A film cartridge 18 such as an advanced photographic system (APS) film cartridge, a 35 mm film cartridge, etc. is housed in a cartridge compartment 12a disposed in rear body member 12. Also disposed within rear body member 12 is a spool 20 for use in film windup which is housed in a spool compartment 12b. A film roller assembly 21 makes film winding possible. A spool compartment 22 cover covers spool compartment 12b and, also supports film roller assembly 21 in a rotating fashion. An additional film roller assembly 23 makes film winding possible. A film guide member within spool compartment 12b supports film roller assembly 23 and also includes a film guide unit 24a which is disposed near film path guides 12d and 22a.

In the present preferred embodiment, apparatus 10 has been mounted to a front body member of a camera. The present invention, however, is not so limited. To the contrary, apparatus 10 may be mounted to the back body member of a camera.

In operation, by rotating film windup shaft 18a in a film start direction, a film strip is expelled (moved) from within cartridge 18 and from a cartridge compartment outlet formed between film path members 12c and 19a. Thereafter, the film strip passes through the film path formed in apparatus 10 to advance into spool compartment 12b and to be wound onto spool 20. The film strip will be pressed by and against pressure plate 10h (e.g., as shown in FIG. 4) to achieve a relatively flat imaging surface (focal plane) in accordance with the present invention.

Figure 8A:
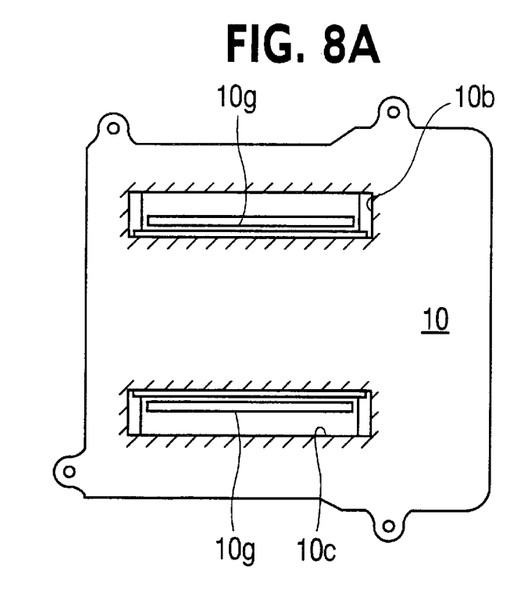
FIGS. 8A, 8B, 8C, and 8D are diagrams of a film strip guide apparatus according to another preferred embodiment of the present invention.
Figure 8B:
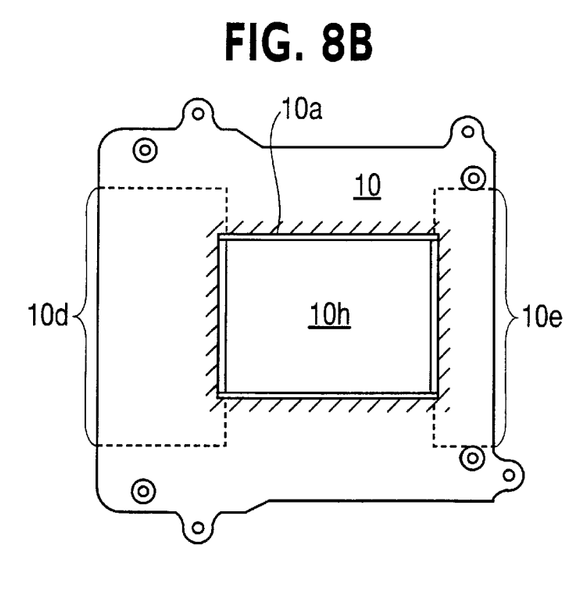
Figure 8C:
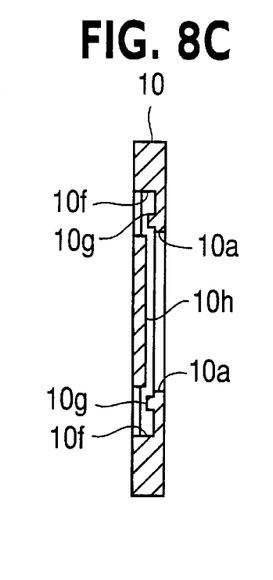
Figure 8D:
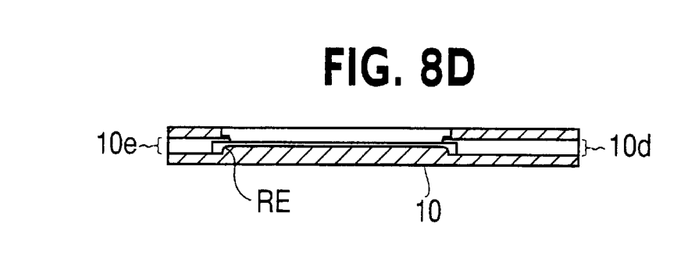

Many modifications may be made to apparatus 10 in accordance with the present invention. For example, openings 10b and 10c of apparatus 10 may be formed in a vertical direction. Additionally, the corner or peripheral edges of pressure plate 10h need not necessarily have a right-angle cross-section, and may be formed with other shapes (e.g., rounded, beveled, slanted, etc.) like or similar to rounded edge RE (FIG. 8D) to suit particular design requirements such as to protect a film strip surface from scratches and abrasions, etc.

In any case, an apparatus and a camera including the same according to the present invention, can realize accurate film positioning and flattening characteristics. Such accuracy will result in fewer lost photographs due to focus problems and the like which often result from negatives that are not properly exposed.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. An apparatus for supporting and guiding a film strip in a camera, comprising:

a back member having a pressure plate configured to contact a film strip in a direction which corresponds to an optical axis of said camera; and a front member integrally formed with said back member and having a plurality of guide rails disposed thereon, said plurality of guide rails are configured to support said film strip during photographic operations within said camera and to guide said film strip during film movement operations, whereby said pressure plate and said plurality of guide rails are configured to flatten said film strip to facilitate photographic operations within said camera.

2. The apparatus according to claim 1, wherein said plurality of guide rails include a pair of outer guide rails defining a film channel in which said film strip can move, and a pair of inner guide rails operable to push against said film strip in a direction toward said pressure plate.

3. The apparatus according to claim 1, further comprising a first side opening allowing said film strip to enter the apparatus after being advanced from a film cartridge, and a second side opening allowing said film strip to exit the apparatus.

4. The apparatus according to claim 1, wherein said pressure plate has an outer peripheral edge having a right-angle cross section.

5. The apparatus according to claim 1, wherein said pressure plate has an outer peripheral edge having a rounded cross section.

6. A camera, comprising:

a body having an interior compartment; and a film strip guide apparatus mounted within said interior compartment of said body and having integrally formed front and back members, said back member having a pressure plate disposed thereon which is configured to contact a film strip in a direction which corresponds to an optical axis of said camera, said front member having a plurality of guide rails which are configured to support said film strip during photographic operations and to guide said film strip during film movement operations.

7. The camera according to claim 6, wherein said camera includes a body having a front member and a back member, and wherein said film strip guide apparatus is mounted to said front member.

8. The camera according to claim 6, wherein said camera includes a body having a front member and a back member, and wherein said film strip guide apparatus is mounted to said back member.

9. The camera according to claim 6, wherein said plurality of guide rails include a pair of outer guide rails defining a film channel in which said film strip can move, and a pair of inner guide rails operable to push against said film strip in a direction toward said pressure plate.

10. The camera according to claim 6, wherein said film strip guide apparatus further comprises a first side opening allowing said film strip to enter the film strip guide apparatus after being advanced from a film cartridge disposed within the camera, and a second side opening allowing said film strip to exit the film strip guide apparatus.

11. The camera according to claim 6, wherein said pressure plate is disposed on a inside surface of said back member of said film strip guide apparatus, and said plurality of guide rails are formed on an inside surface of said front member of said film strip guide apparatus.

12. The camera according to claim 6, wherein said pressure plate has an outer peripheral edge having a right-angle cross section.

13. The camera according to claim 6, wherein said pressure plate has an outer peripheral edge having a rounded cross section.

* * * * *